US007003027B2

(12) United States Patent
Lai et al.

(10) Patent No.: US 7,003,027 B2
(45) Date of Patent: Feb. 21, 2006

(54) EFFICIENT PCM MODEM

(75) Inventors: Yhean-Sen Lai, Warren, NJ (US);
Kannan Rajamani, Edison, NJ (US)

(73) Assignee: Agere Systems Inc., Allentown, PA (US)

( * ) Notice: Subject to any disclaimer, the term of this patent is extended or adjusted under 35 U.S.C. 154(b) by 765 days.

(21) Appl. No.: 10/016,438

(22) Filed: Dec. 10, 2001

(65) Prior Publication Data

US 2003/0108093 A1    Jun. 12, 2003

(51) Int. Cl.
*H04B 1/38*      (2006.01)
*H04L 7/00*      (2006.01)

(52) U.S. Cl. ....................... 375/222; 375/355

(58) Field of Classification Search ........ 375/229–236, 375/222, 285, 219, 350, 355, 299, 227, 371, 375/232, 293; 370/286–292, 32.1, 516, 276; 379/406, 410, 399, 411, 406.01, 406.08; 364/724.01; 455/182.2, 183.1, 192.2; 327/141
See application file for complete search history.

(56) References Cited

U.S. PATENT DOCUMENTS

| 4,866,647 A | | 9/1989 | Farrow ..................... 364/724.1 |
|---|---|---|---|
| 4,896,334 A | * | 1/1990 | Sayar ......................... 375/293 |
| 5,163,044 A | * | 11/1992 | Golden ....................... 370/286 |
| 5,577,027 A | * | 11/1996 | Cheng ........................ 370/286 |
| 5,790,658 A | * | 8/1998 | Yip et al. ............... 379/406.09 |
| 5,793,801 A | * | 8/1998 | Fertner ....................... 375/219 |
| 5,841,809 A | * | 11/1998 | Koizumi et al. ............. 375/233 |
| 5,864,545 A | * | 1/1999 | Gonikberg et al. .......... 370/286 |
| 6,240,128 B1 | * | 5/2001 | Banerjea et al. ............ 375/222 |
| 6,317,419 B1 | * | 11/2001 | Olafsson et al. ............ 370/292 |
| 6,404,809 B1 | * | 6/2002 | Zhang ........................ 375/232 |
| 6,434,233 B1 | * | 8/2002 | Bjarnason et al. ...... 379/406.01 |
| 6,560,276 B1 | * | 5/2003 | Long et al. ................. 375/222 |
| 6,661,837 B1 | * | 12/2003 | Davis et al. ................ 375/227 |
| 6,795,494 B1 | * | 9/2004 | Phanse et al. .............. 375/219 |

OTHER PUBLICATIONS

Efficient near optimal maximum likelihood symbol timing recovery in digital modems; Tuukkanen, V.et al; Personal, Indoor&Mobile Radio Comm., 1997. 'Waves of the Year 2000'. PIMRC '97., 8th IEEE int'l Symposium on vol. 3, Sep. 1-4 Page(s):825-829.*
Optimal Farrow coefficients for symbol timing recovery Watkins, G.; Communications Letters, IEEE vol. 5, Issue 9, Sep. 2001 Page(s):381-383.*

(Continued)

*Primary Examiner*—Jay K. Patel
*Assistant Examiner*—Jacob Meek
(74) *Attorney, Agent, or Firm*—Synnestvedt Lechner & Woodbridge LLP

(57) ABSTRACT

Apparatus and devices used to achieve a computationally efficient modem having a transmit path and a receive path. The apparatuses include a Farrow phase shifter for shifting the phase of signals in the transmit path, a fractionally spaced equalizer capable of equalization and signal decimation in the receive path, a primary echo sub-canceler and a post equalizer echo canceler for canceling echoes on the receive path, and a phase locked loop and add/delete register for controlling the sampling rate of a CODEC. The method includes shifting the phase of a transmit signal using a Farrow structure, equalizing and decimating a receive signal with a fractionally spaced equalizer, canceling primary echoes on the receive signal using a sub-canceler structure and canceling remaining echoes using a post equalizer echo canceler, and adjusting the sampling rate of a CODEC using a phase locked loop and an add/delete register.

19 Claims, 1 Drawing Sheet

OTHER PUBLICATIONS

Optimal interpolator using a trigonometric polynomial Dengwei Fu; Willson, A.N.jr.; Circuits and Systems, 2000. Proceedings of the 43rd IEEE Midwest Symposium on vol. 3, Aug. 8-11, 2000 Page(s):1206-1209 vol. 3.*

A survey of digital phase-locked loops Lindsey, W.C.; Chak Ming Chie; Proceedings of the IEEE vol. 69, Issue 4, Apr. 1981 Page(s):410-431.*

J. Cioffi and J. Bingham, "A Data Multitone Echo Canceller", IEEE Transaction on Communications, vol. 42, No. 10, Oct. 1994, pp. 2853-2869.

R. Schafer and L. Rabiner, "A Digital Signal Processing Approach to Interpolation", Proceedings of the IEE, vol. 61, No. 6, Jun. 1973, pp. 692-702.

* cited by examiner

EFFICIENT PCM MODEM

FIELD OF THE INVENTION

The present invention relates to telecommunications and, more particularly, to telephone modems.

BACKGROUND OF THE INVENTION

Modems are telecommunication devices used to transfer information between a first digital device, e.g., a computer, and a communication medium, such as a twisted pair telephone line, for communication with a second device at a telephone company central office (TCCO), for example. In order to communicate with the TCCO, the modem must perform a number of functions to ensure that the TCCO can interpret signals sent from the modem and that the modem can interpret signals received from the TCCO. Generally, the functions that the modem must perform are set forth in modem specifications developed by a telecommunications standards organization such as the International Telecommunications Union (ITU).

Modern modem specifications, such as the V.92 dial-up modem specification developed by the ITU, set forth the functions that a modem in accordance with the specification must perform. These functions may include: modifying the phase and timing of the outgoing and incoming communication signals, canceling echos on incoming communication signals, and matching code sampling rates through interpolation and decimation.

Many of the functions that a modem performs are accomplished via software running on a digital signal processor (DSP). Typically, these functions require a great deal of processing by the DSP, which uses processing power that could be utilized for other tasks. Accordingly, there is a need for apparatus and devices capable of performing the functions of a modem more efficiently, thereby freeing processing power for performing other tasks. The present invention fulfills this need among others.

SUMMARY OF THE INVENTION

The present invention provides for efficient apparatus and methods to perform modem functions, which overcome the aforementioned problems. Efficiencies are achieved in the present invention through the use of computationally efficient phase shifters, echo cancelers, and timing recovery devices. In addition, efficiencies can be achieved by reducing the number of interpolators and decimators that adjust sampling rates within the modem by incorporating their function into other apparatuses within the modem.

One aspect of the present invention is a modem for establishing communication between a first device and a second device via a communication medium, the modem being coupled to the communication medium through a hybrid circuit to pass a transmit signal generated by the first device via a transmitter to the communication medium and pass a receive signal from the communication medium to a receiver for processing by the first device. The modem includes a Farrow phase shifter positioned between the first device and the hybrid circuit to shift the phase of the transmit signal; an equalizer having an adaptive input positioned between the hybrid circuit and the first device to minimize intersymbol interference in the receive signal; a primary echo sub-canceler having an input coupled between the Farrow phase shifter and the hybrid circuit to receive the phase shifted transmit signal and an output coupled between the hybrid circuit and the equalizer to remove a first portion of an echo in the receive signal; a post equalizer echo canceler having an input coupled between the Farrow phase shifter and the hybrid circuit to receive the phase shifted transmit signal and an output coupled between the equalizer and the first device to remove a second portion of the echo in the receive signal, the post equalizer echo canceler having an adaptive input; and a slicer positioned between the output of the post equalizer echo canceler and the first device, the slicer having an output for producing a standard symbol value which is a representation of a current symbol value being supplied at an input by the receive signal, the difference between the input and the output of the slicer being supplied to the adaptive input of the equalizer and to the adaptive input of the post equalizer echo canceler.

Another aspect of the invention is a method for use in a modem to establish a communication between a first device and a second device via a communication medium, the modem being coupled to the communication medium through a hybrid circuit to pass a transmit signal generated by the first device via a transmitter to the communication medium and pass a receive signal from the communication medium to the first device via a receiver. The method includes the steps of shifting the phase of the transmit signal using a Farrow structure; generating a first echo estimate signal from the phase shifted transmit signal using a sub-canceler echo canceler structure; generating a second echo estimate signal based on the phase shifted transmit signal and an adaptive signal using an infinite impulse response filter; converting the transmit signal from digital to analog at a sampling rate; passing the analog transmit signal to the hybrid circuit; receiving a receive signal from the hybrid circuit; converting the receive signal from the hybrid circuit from analog to digital at the sampling rate; subtracting the first echo estimate signal from the receive signal; adjusting the sampling rate based on the receive signal after subtracting the first echo estimate signal; equalizing the receive signal based on the adaptive signal; subtracting the second echo estimate signal from the equalized receive signal; slicing the equalized receive signal for processing by the first device via the receiver; subtracting the receive signal prior to slicing from the downstream data stream after slicing to generate the adaptive signal.

DETAILED DESCRIPTION OF THE INVENTION

Figure 1:
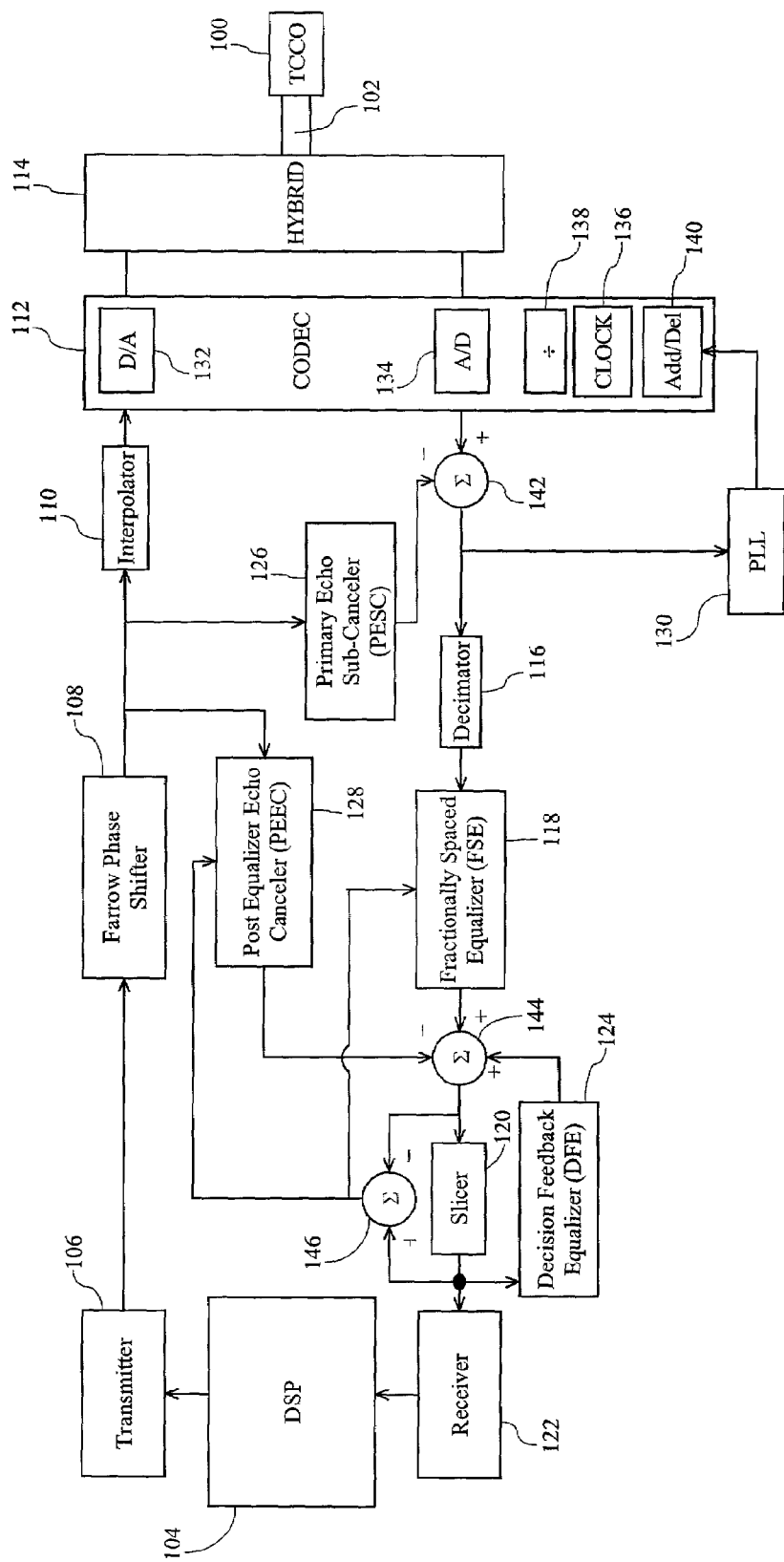
FIG. 1 is a block diagram of a computationally efficient modem in accordance with the present invention.

FIG. 1 depicts a block diagram of a computationally efficient modem for establishing communication between a first device, e.g., a DSP 104, and a second device, e.g., a device at a TCCO 100, via a communication medium such as a twisted pair telephone line 102. In a general overview, an upstream data stream produced by a digital signal processor (DSP) 104 is passed through a transmitter 106, a Farrow phase shifter 108, an interpolator 110, a coder/decoder (CODEC) 112, and a hybrid circuit 114 to create a transmit signal for transmission over the twisted pair telephone line 102 to the TCCO 100. A receive signal received from the TCCO 100 over the twisted pair telephone line 102 is passed through the hybrid circuit 114, the CODEC 112, a decimator 116, a fractionally spaced equalizer 118, a slicer 120, and a receiver 122 to yield a downstream data stream for processing by the DSP 104. Equalization of the receive signal is performed by the fractionally spaced equalizer (FSE) 118 and a decision feedback equalizer (DFE) 124. Echoes on the receive signal are removed through the use of a computationally efficient combination of a primary echo sub-canceler (PESC) 126 and a post equalizer echo canceler (PEEC) 128. In addition, the timing of the CODEC 112 is adjusted through the use of a phase locked loop (PLL) 130.

FIG. 1 will now be described in detail. An upstream stream of data for transmission is supplied to the transmitter 106 by the DSP 104. It is understood that the DSP 104 may be essentially any device capable of processing signals. The transmitter 106 scrambles and encodes the bits within the stream of data in a known manner. Thereafter, the encoded data is mapped and modulated to generate a transmit signal that represents a version of the encoded stream of data.

The transmit signal out of the transmitter 106 is phase shifted by a Farrow phase shifter 108. The phase of the transmit signal is shifted such that a signal, which is based on the transmit signal, received at the TCCO 100 has an appropriate phase. The necessary phase shift introduced by the Farrow phase shifter 108 is calculated at the TCCO 100 and transmitted from the TCCO 100 to the modem using known training protocol.

The Farrow phase shifter 108 is a phase shifter that incorporates a Farrow structure. A Farrow structure can be easily implemented by the DSP 104 to perform phase shifting of the transmit signal. In addition, Farrow structures are computationally efficient, thereby minimizing memory requirements and the number of instructions per second required from the DSP 104 to shift the phase of the transmit signal. An example Farrow structure is of a type described in an article entitled "A Continuously Variable Digital Delay Element," IEEE International Symposium on Circuits and Systems, (ISCAS 1988), Jun. 6–9, 1988, pages 2641–2645, incorporated fully herein by reference. Also, see U.S. Pat. No. 4,866,647 issued to Cecil W. Farrow on Sep. 12, 1989, incorporated fully herein by reference. The adaptation of a Farrow structure to shift the phase of a transmit signal will be readily apparent to those skilled in the art.

The transmit signal out of the Farrow phase shifter 108 is interpolated by an interpolator 110. The interpolator 110 converts the sample rate of the phase shifted transmit signal to a common sample rate employed by the CODEC 112. It should be noted that in certain applications the sample rate out of the Farrow phase shifter 108 is the same as the sample rate of the CODEC 112, or the Farrow phase shifter 108 may perform some or all of the interpolation in a known manner, thereby eliminating or reducing the need for the interpolator 110.

The transmit signal out of the interpolator 106 is converted from digital to analog by a digital-to-analog (D/A) converter 132 and, then, supplied to a hybrid circuit 114. Also, an analog receive signal from a remote device, e.g., a modem, at the TCCO 100 is supplied via the twisted pair telephone line 102 to the hybrid 114 and, then, to an analog-to-digital (A/D) converter 134 to convert the receive signal from analog to digital. The hybrid circuit 114 is employed to supply the analog version of the transmit signal to a twisted pair telephone line 102 for transmission to a remote modem at the TCCO 100, and to supply an analog version of the receive signal from the remote modem at the TCCO 100 to the modem. Hybrid circuits for interconnecting two-wire to four-wire telephone lines and vice versa are well known in the art, as are their problems and limitations regarding echoes on receive signals.

The sampling rate of the D/A converter 132 and the A/D converter 134 is controlled by a clock 136. In certain embodiments, the clock 136 has a clock rate that is divided several times by a divider 138 to obtain the sampling rate. For example, if the sampling rate is approximately 32 kHz and the clock's rate is approximately 1 MHz, the clock 136 can be divided by five (5) divide-by-two dividers 138 to obtain the sampling rate of approximately 32 kHz. In certain embodiments, a known add/delete register 140 is used to add or delete one clock cycle from the highest clock rate, e.g., the 1 Mhz clock. By adding or deleting clock cycles from a higher rate clock 136, very precise changes to the sampling rate can be achieved. In one embodiment, the addition and deletion of a clock cycle from the clock rate is performed by a phase locked loop 130, which will be described below. In certain embodiments, the D/A converter 132, the A/D converter 134, the clock 136, and the add/delete register 140 are contained within a single CODEC 112.

The receive signal from the A/D converter 134 is supplied to a positive input of an algebraic combining unit 142. A first echo estimate signal generated by the PESC 126 is algebraically subtracted from the received signal by the algebraic combining unit 142 to remove a first portion of an echo on the receive signal, thereby yielding a receive signal and an error signal. The resultant error signal contains only elements related to intersymbol interference and line noise.

The PESC 126 generates the first echo estimate signal for removing the first portion of the echo from the receive signal. The PESC 126 is an adaptive transversal filter that receives the transmit signal out of the Farrow phase shifter 108 at an input and generates the first echo estimate signal at an output. The coefficients for the taps of the adaptive transversal filter are determined using known training protocol and are not updated after training. In use, an impulse response characteristic is generated in the PESC 126, which generates the first echo estimate signal that will eliminate the major portion of any echo signal on the same path as the receive signal.

In certain embodiments, the PESC 126 is implemented using a sub-canceler structure. The coefficients for the taps of the sub-cancelers are trained during a known half-duplex training mode using a known least-mean-square (LMS) algorithm and, specifically, during the "hand shaking" period between the modem depicted in FIG. 1 and a remote modem at the TCCO 100. The selection of a PESC 126 that incorporates an appropriate number of sub-cancelers will be readily apparent to those skilled in the art. In one embodiment, the PESC 126 incorporates four (4) sub-cancelers. Sub-canceler structures are well known adaptive transversal structures that are computationally efficient and can be easily implemented by the DSP 104.

The first error signal out of the algebraic combining unit 142 is supplied to the PLL 130. The PLL 130 is configured to adjust the sampling rates of the D/A converter 132 and the A/D converter 134 through the add/delete register 140 and the clock 136, thereby adjusting the phase of the receive signal. The PLL 130, the clock, 136, the divider 138, and the add/delete register 140 form a timing adjustment circuit for adjusting the sampling rate of the converters 132, 134. If the PLL 130 determines that a clock cycle should be added to the clock 136, the PLL 130 will generate an indicator having a first value that is supplied to the add/delete register 140 to instruct the add/delete register 140 to add a clock cycle to the clock 136. Likewise, if the PLL 130 determines that a clock cycle should be removed from the clock 136, the PLL 130 will generate an indicator having a second value that is supplied to the add/delete register 140 to instruct the add/ delete register 140 to remove a clock cycle from the clock 136. By adding/deleting clock cycles, fine adjustments to the sampling rate of the D/A converter 132 and the A/D converter 134 can be performed in a computationally efficient manner. The development of a suitable PLL 130 will be readily apparent to those skilled in the art.

The receive signal out of the algebraic combining unit 142 is decimated by the decimator 116 to reduce the sample rate, if necessary. The receive signal out of the decimator 116 is then equalized by a fractionally spaced equalizer 118, which is employed to reduce intersymbol interference in a well-known manner. The fractionally spaced equalizer 118 includes an adaptive transversal filter that is responsive to an adaptive signal at an adaptive input. The adaptive signal is based on the input and output of the slicer 120 described below. In certain embodiments, the fractionally spaced equalizer 118 decimates the receive signal in a known manner, or the sample rate does not need to be reduced, thereby eliminating or reducing the need for a separate decimator 116.

The receive signal out of the equalizer 118 is supplied to a positive input of a known algebraic combining unit 144. A second echo estimate signal generated by the PEEC 128 is algebraically subtracted from the receive signal by the algebraic combining unit 144 to remove a second portion of the echo from the receive signal.

The PEEC 128 generates the second echo estimate signal for canceling echoes that arise during the operation of the modem of FIG. 1, such as echoes due to temperature variations in the modem's circuitry. The PEEC 128 is an adaptive transversal filter that receives the transmit signal out of the Farrow phase shifter 108 at an input and an adaptive signal, based on the input and output of the slicer 120 described below, at an adaptive input; and processes the signals to generate the second echo estimate signal at an output. The coefficients for the taps of the adaptive transversal filter are determined using known training protocol and are updated during normal operation of the modem. In use, an impulse response characteristic is generated in the PEEC 128, which generates the second echo estimate signal to remove remaining echo signals on the same path as the receive signal.

In an embodiment of the invention, the PEEC 128 is utilized in conjunction with the PESC 126. The PESC 126 is employed before the equalizer 118 to cancel a major portion of any echo signal, while the PEEC 128 is employed after the equalizer 118 to cancel echo signals caused by temperature variations of components within the modem. The PEEC 128 may use either a finite impulse response (FIR) filter or an infinite impulse response (IIR) filter. Generally, a long FIR filter can be replaced with a short IIR filter, which is computationally efficient. An example of an echo canceler incorporating a PESC 126 and a PEEC 128 can be found in commonly assigned U.S. Pat. No. 6,240,128 to Banerjea et al. entitled Enhanced Echo Canceler, incorporated fully herein by reference.

It will be apparent to those skilled in the art that the PEEC 128 can be employed by itself to combat both the primary echo component and echo components which arise during normal operation of the modem. By employing the PESC 126 to combat the primary echo component, however, the dynamic range of the echo is reduced, which translates into more rapid and more accurate tracking capability by the PEEC 128.

The receive signal out of the algebraic combining unit 144 is supplied to the slicer 120 for "slicing." The slicer 120 is employed in a known manner to compare incoming symbol values to standard symbol values and, then, supply the closest standard symbol value to the current incoming symbol value at an output of the slicer 120. The input to the slicer 120 is subtracted from the output of the slicer 120 by a known algebraic combining unit 146. The resultant signal out of the algebraic combining unit 146 is the adaptive signal that is supplied to the adaptive input of the FSE 118 to adjust its coefficients in a known manner to minimize intersymbol interference in the receive signal. In addition, the adaptive signal is supplied to the adaptive input of the PEEC 128 to adjust its coefficients.

An output from the slicer 120 is also supplied to the DFE 124 and the receiver 122. The DFE 124 is a known equalizer for removing any residual intersymbol interference in the output from the slicer 120. The receiver 122 demaps and demodulates the standard symbols in the receive signal from the slicer 120 into encoded data bits. The encoded data bits are then descrambled and decoded by the receiver 122, thereby yielding a downstream stream of data 126 for processing by the DSP 104.

Having thus described a few particular embodiments of the invention, various alterations, modifications, and improvements will readily occur to those skilled in the art. For example, the present application has been directed to establishing communication with a device, e.g., a modem, at a TCCO, however, the present invention could be employed to establish communication with devices at essentially any residential or commercial location. In addition, the detailed description focuses on the use of a twisted pair telephone line as the communication medium, however, the present invention may be utilized with other communication mediums such as fiberoptic and wireless communication mediums. Such alterations, modifications and improvements as are made obvious by this disclosure are intended to be part of this description though not expressly stated herein, and are intended to be within the spirit and scope of the invention. Accordingly, the description is by way of example only, and not limiting. The invention is limited only as defined in the following claims and equivalents thereto.

What is claimed is:

1. A modem for establishing communication between a first device and a second device via a communication medium, said modem for passing a transmit signal generated by the first device via a transmitter to the communication medium and passing a receive signal from the communication medium to a receiver for processing by the first device, said modem coupled to the communication medium through a hybrid circuit, said modem comprising:

a Farrow phase shifter positioned between the first device and the hybrid circuit to shift the phase of the transmit signal;

an equalizer positioned between the hybrid circuit and the first device to minimize intersymbol interference in the receive signal, said equalizer having an adaptive input;

a primary echo sub-canceler having an input coupled between the Farrow phase shifter and the hybrid circuit to receive the phase shifted transmit signal and an output coupled between the hybrid circuit and the equalizer, said primary echo sub-canceler adapted to remove a first portion of an echo in the receive signal;

a post equalizer echo canceler having an input coupled between the Farrow phase shifter and the hybrid circuit to receive the phase shifted transmit signal and an output coupled between said equalizer and the first device, said post equalizer echo canceler adapted to remove a second portion of the echo in the receive signal, said post equalizer echo canceler having an adaptive input; and a slicer positioned between the output of the post equalizer echo canceler and the first device, said slicer having an output for producing a standard symbol value which is a representation of a current symbol value being supplied at an input of said slicer by the receive signal, the difference between the input and the output of said slicer being supplied to the adaptive input of said equalizer and to the adaptive input of said post equalizer echo canceler.

2. The modem of claim 1, further comprising:

an interpolator positioned between said Farrow phase shifter and the hybrid circuit to increase the sampling rate representing the phase shifted transmit signal.

3. The modem of claim 1, wherein said Farrow phase shifter further performs the function of interpolating said transmit signal.

4. The modem of claim 1, further comprising:

a decimator positioned between the input to the primary echo sub canceler and the hybrid circuit to decrease the sampling rate representing the receive signal.

5. The modem of claim 4, wherein said equalizer further performs the functions of decimating said receive signal.

6. The modem of claim 1, further comprising:

a clock having a first clock rate;

at least one divider for reducing said first clock rate to a second clock rate;

a D/A converter coupled between the input of the primary echo sub-canceler and the hybrid circuit for converting the transmit signal from digital to analog, said D/A converter operating at said second clock rate;

an A/D converter coupled between the hybrid circuit and the output of the primary echo sub-canceler for converting the receive signal from analog to digital, said A/D converter operating at said second clock rate;

an add/delete register coupled to said clock for adjusting said first clock rate by at least one clock cycle; and a phase locked loop having an input coupled between the output of the primary echo sub-canceler and the equalizer and an output coupled to said add/delete register for prompting said add/delete register to adjust said first clock rate by said at least one clock cycle, thereby adjusting said second clock rate.

7. The modem of claim 1, wherein said post equalizer echo canceler comprises an infinite impulse response filter.

8. The modem of claim 1, wherein said primary echo sub-canceler comprises four sub-cancelers.

9. A modem for establishing communication between a first device and a second device via a communication medium, said modem for passing an upstream data stream generated by the first device to the communication medium and passing a downstream data stream from the communication medium to the first device, said modem coupled to the communication medium through a hybrid circuit, said modem comprising:

a transmitter having an input for receiving the upstream data stream from the first device and an output for passing a transmit signal;

a Farrow phase shifter having an input coupled to the output of said transmitter and an output, said Farrow phase shifter shifting the phase of said transmit signal;

a D/A converter having a digital input for receiving said phase shifted transmit signal and an analog output for coupling to the hybrid circuit, said D/A converter operating at a first clock rate;

an A/D converter having an analog input for coupling to the hybrid and an digital output, said A/D converter converting a receive signal received from the hybrid circuit from analog to digital, said A/D converter operating at said first clock rate;

a primary echo sub-canceler having an input coupled to the output of said Farrow phase shifter to generate a first echo estimate signal;

a first algebraic combining unit for algebraically subtracting the first echo estimate signal from the receive signal;

an equalizer for processing the receive signal from the first algebraic combining unit to minimize intersymbol interference, said equalizer having an adaptive input;

a post equalizer echo canceler having an input coupled to the output of said Farrow phase shifter, an adaptive input, and an output, said post equalizer echo canceler generating a second echo estimate signal at the output;

a second algebraic combining unit for algebraically subtracting the second echo estimate signal from the receive signal out of said equalizer;

a slicer for receiving the receive signal from said second algebraic combining unit, said slicer having an output for producing a standard symbol value which is a representation of the current symbol value being supplied at an input;

a third algebraic combining unit for algebraically subtracting said current symbol value from said standard symbol value, the difference being supplied to the adaptive input of said equalizer and to the adaptive input of said post equalizer echo canceler; and a receiver having an input for receiving said standard symbol value and an output for coupling to the first device, said transmitter passing the downstream data stream at the output, the downstream data stream based on said standard symbol values at the output of said slicer.

10. The modem of claim 9, further comprising a timing adjustment circuit having an input coupled to the output of said first algebraic combining and an output for adjusting said first clock rate.

11. The modem of claim 10, said timing adjustment circuit comprising at least:

a clock having a second clock rate;

at least one divider for reducing said second clock rate to said first clock rate;

an add/delete register for adjusting said second clock rate by at least one clock cycle; and a phase locked loop having an input coupled to the output of said first algebraic combining unit and an output coupled to said add/delete register for prompting said add/delete register to adjust said second clock rate by said at least one clock cycle, thereby adjusting said first clock rate.

12. The modem of claim 9, wherein said equalizer comprises at least a fractionally spaced equalizer.

13. The modem of claim 12, wherein said equalizer further comprises a decimator.

14. The modem of claim 9, further comprising:

a decision feedback equalizer having an input coupled to the output of said slicer and an output coupled to an additive input of said second algebraic combining unit.

15. The modem of claim 9, further comprising:

an interpolator coupled between said Farrow phase shifter and the digital input of said D/A converter; and a decimator coupled between the output of said first algebraic combining unit and said equalizer.

16. A sample rate adjustment circuit for adjusting the sampling rate of a CODEC in a modem having a transmit path and a receive path, said circuit comprising:
   a clock having a clock rate;
   a divider for dividing said clock rate to achieve the sampling rate;
   an add/delete register coupled to said clock for adjusting said clock rate by at least on clock cycle based on a signal received at an input;
   a primary echo sub-canceler for generating an echo estimate signal based on a transmit signal on the transmit path;
   an algebraic combining unit for subtracting said echo estimate signal from a receive signal on the receive path; and
   a phase locked loop having an input coupled to an output of said algebraic combining unit and an output coupled to the input of said add/delete register, said phase locked loop controlling said add/delete register to adjust said clock rate by said at least one clock cycle based on the output of said algebraic combining unit, thereby controlling the sampling rate.

17. A method for use in a modem to establish communication between a first device and a second device via a communication medium, said modem for passing a transmit signal generated by the first device via a transmitter to the communication medium and passing a receive signal from the communication medium to the first device via a receiver, said modem coupled to the communication medium through a hybrid circuit, said method comprising the steps of:
   shifting the phase of the transmit signal using a Farrow structure;
   generating a first echo estimate signal from the phase shifted transmit signal using a sub-canceler echo canceler structure;
   generating a second echo estimate signal based on the phase shifted transmit signal and an adaptive signal using an infinite impulse response filter;
   converting the transmit signal from digital to analog at a sampling rate;
   passing the analog transmit signal to the hybrid circuit;
   receiving a receive signal from the hybrid circuit;
   converting the receive signal from the hybrid circuit from analog to digital at said sampling rate;
   subtracting said first echo estimate signal from the receive signal;
   adjusting said sampling rate based on the receive signal after subtracting said first echo estimate signal;
   equalizing the receive signal based on said adaptive signal;
   subtracting said second echo estimate signal from the equalized receive signal;
   slicing the equalized receive signal for processing by the first device via the receiver; and
   subtracting the receive signal prior to slicing from the downstream data stream after slicing to generate said adaptive signal.

18. The method of claim 17, further comprising:
   feedback equalizing the equalized receive signal based on the receive signal after slicing.

19. The method of claim 17, wherein said adjusting step comprises the steps of:
   generating a clock rate;
   dividing said clock rate to achieve said sampling rate;
   generating an indicator based on the receive signal after subtracting said first echo estimate signal, said indicator having either a first value or a second value;
   subtracting a clock cycle from said clock rate if said indicator is said first value; and
   adding a clock cycle to said clock rate if said indicator is said second value.

* * * * *